(12) United States Patent
De Zwart et al.

(10) Patent No.: US 7,903,332 B2
(45) Date of Patent: Mar. 8, 2011

(54) STEREOSCOPIC DISPLAY APPARATUS

(75) Inventors: Siebe Tjerk De Zwart, Eindhoven (NL);
Wilbert L. Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 140 days.

(21) Appl. No.: 11/576,909

(22) PCT Filed: Sep. 26, 2005

(86) PCT No.: PCT/IB2005/053175
§ 371 (c)(1),
(2), (4) Date: Apr. 9, 2007

(87) PCT Pub. No.: WO2006/040698
PCT Pub. Date: Apr. 20, 2006

(65) Prior Publication Data
US 2007/0247708 A1 Oct. 25, 2007

(30) Foreign Application Priority Data
Oct. 13, 2004 (EP) .................................. 04105014

(51) Int. Cl.
*G02B 27/22* (2006.01)
(52) U.S. Cl. .............................. 359/463; 359/462; 348/59
(58) Field of Classification Search .................. 359/463, 359/462; 348/59
See application file for complete search history.

(56) References Cited

U.S. PATENT DOCUMENTS

| 3,409,351 A | * | 11/1968 | Winnek ............................ 353/7 |
| 5,493,427 A | * | 2/1996 | Nomura et al. .................... 349/5 |
| 6,064,424 A | | 5/2000 | Van Berkel et al. |
| 6,118,584 A | | 9/2000 | Van Berkel et al. |
| 6,445,406 B1 | * | 9/2002 | Taniguchi et al. ............... 348/51 |
| 7,050,020 B2 | * | 5/2006 | Uehara et al. ..................... 345/6 |
| 2004/0169919 A1 | | 9/2004 | Uehara |
| 2004/0263971 A1 | * | 12/2004 | Lipton et al. ................. 359/463 |

FOREIGN PATENT DOCUMENTS

| EP | 597629 A1 | 5/1994 |
| EP | 625861 | 11/1994 |
| EP | 791847 | 8/1997 |
| JP | 09096777 | 4/1997 |
| JP | 2003066548 | 3/2003 |
| WO | 03071335 | 8/2003 |

OTHER PUBLICATIONS

Borner R: "Four Autostereoscopic Monitors", Elsevier Science Publishers, vol. 2, No. 2, pp. 57-64, 1999, XP004178945.
Berkel Van C et al: "Characterisation and Optimisation of 3D-LCD Module Design" Proceedings of the SPIE, Bellingham, vol. 3012, pp. 179-186, 1997, XP009000176.
W. L. Ijzerman and S. T. De Zwart: "Lenticular Design for 3D Displays", Nat. Lab., Technical Note PR-TN-2004/00179.

* cited by examiner

*Primary Examiner* — Audrey Y Chang
(74) *Attorney, Agent, or Firm* — Larry Liberchuk

(57) ABSTRACT

In a stereoscopic display apparatus having optical directory elements such as lenticular elements (4) extending parallel to each other and being slanted at an angle to one of the rows and columns of picture element the picture elements (2) are positioned out of focus at the optical directory elements, in such a manner that the modulation depth of "dark bands" is minimized.

12 Claims, 3 Drawing Sheets

STEREOSCOPIC DISPLAY APPARATUS

The invention relates to a stereoscopic display apparatus comprising means for producing a display having laterally separated picture elements in a first plane and optical directory means comprising a group of optical directory elements each of which is associated with a group of picture elements, the optical directory means overlying the picture elements in the first plane for directing the outputs of the display elements in mutually different angular directions.

Such stereoscopic display apparatuses are increasingly used both in hand held applications like telephones and in (TV) monitors, where a multiple view is used.

A stereoscopic display apparatus of the kind mentioned above is described in U.S. Pat. No. 6,118,584, which shows an active matrix liquid crystal display panel having picture elements arranged in groups of picture elements and a lenticular screen having (cylindrical) lenticular elements, or lenticulars, overlying the display panel. To prevent unwanted artifacts such as dark banding caused by a black matrix each lenticular is associated with a group of picture elements, the picture elements in each group being arranged such that in the column direction adjacent display elements overlap each other. In this display apparatus the distance between the lenses and the picture elements is approximately equal to the focal distance of the lenses. Each lens covers several picture elements. The light of each picture element is sent into different well-defined directions depending on the position of the picture element with respect to the lenses. This way typically nine independent views are created corresponding to nine different viewing angles. A viewer receives different views in each eye and, when using the proper image content, observes a three-dimensional image.

For a viewer however due to the fact that different parts of the display reach the viewer's eye under different angles an intensity modulation on the display still occurs, referred to as "dark bands". The bands "shift" over the display as the viewer moves parallel to the display and the pitch of the bands changes as the viewer moves towards the display or away from the display. Even with a small modulation depth (e.g. only 1%) the effect is very annoying.

In a device according to the invention the first plane lies substantially out of the main focus plane of the optical directory elements. With a main focus plane the plane is meant which substantially coincides with a focus plane of the central part of the optical directory elements. For instance, if a row of cylindrical lenticulars is used, due to manufacturing process, the focus may vary, especially at the sides adjoining the neighboring cylindrical lenticulars.

The invention is based on the understanding that by designing the lenses such that the display surfaces (LCD cells) are deliberately "out of focus" the modulation depth of the bands is minimized. If the lens is designed such that it focus is exactly coinciding with the main focus plane the total intensity of all views shows the above mentioned modulation as a function of viewing angle. This is caused by the presence of non-emitting areas (black matrix) around the (LCD) picture elements, which are "imaged" into certain—hence darker—directions. For a viewer the angular modulation generally translates into the above-mentioned "dark bands".

These and other aspects of the invention are apparent from and will be elucidated with reference to the embodiments described hereinafter.

In the drawings:

FIG. 1 schematically shows a part of a device according to the invention,

FIG. 2 shows a plan view of the part of the device of FIG. 1, while

The Figures are diagrammatic and not to scale; corresponding components are generally denoted by the same reference numerals.

Figure 1:
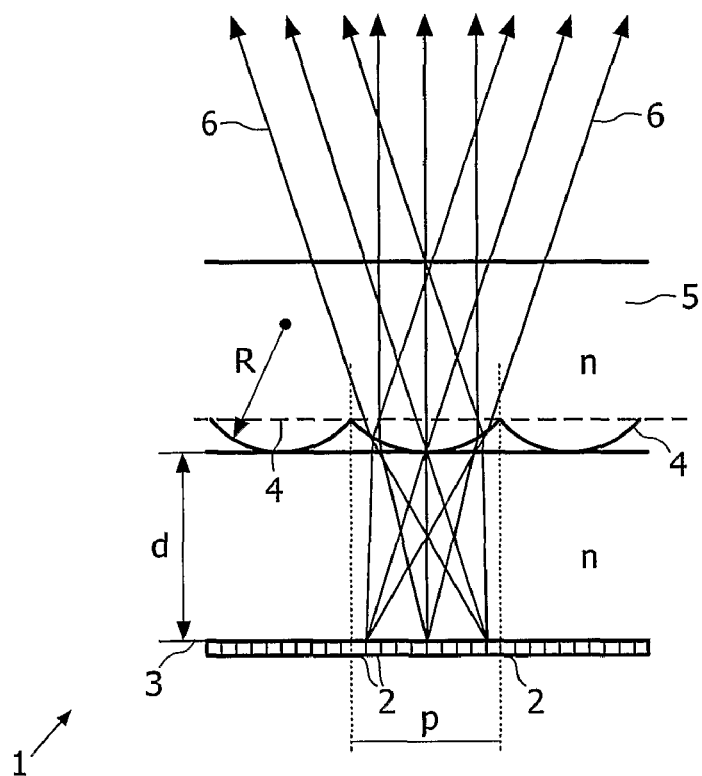

FIG. 1 shows a schematic diagram of a part of a device 1 according to the invention having a display device 5 with laterally separated picture elements 2 in a first plane 3. The device 1 has optical directory means, in this example a group of lenses (lenticulars) 4, each of which is associated with a group of picture elements 2. The lenses 4 cover the picture elements 2 in the first plane 3 for directing the outputs of the picture elements in mutually different angular directions, the first plane lying substantially out of the main focus plane of the lenses 4. In this example the lenses are provided on a separate plate 5 in front of the display, with the curved side facing the display. The angular directions are indicated by means of arrows 6. The tangent of the angle α that the longitudinal sides of the lenticulars make with the vertical axis is ⅙ (see FIG. 2). Hence, in this particular case α=atan(⅙), which can be positive or negative. The lenticulars are slanted to improve the perceived picture element structure. The pitch p of the lenses is essentially such that distance between the lenses measured in the horizontal direction equals 4.5 times the sub-picture element pitch A, i.e. p=4.5*A/cos(α). This results in a 2*4.5=9 views display. The index of refraction of the display front panel 7 and the index of refraction of lenses is chosen n=1.5. Furthermore, the lens bodies are (parts of) cylinders.

Figure 2:
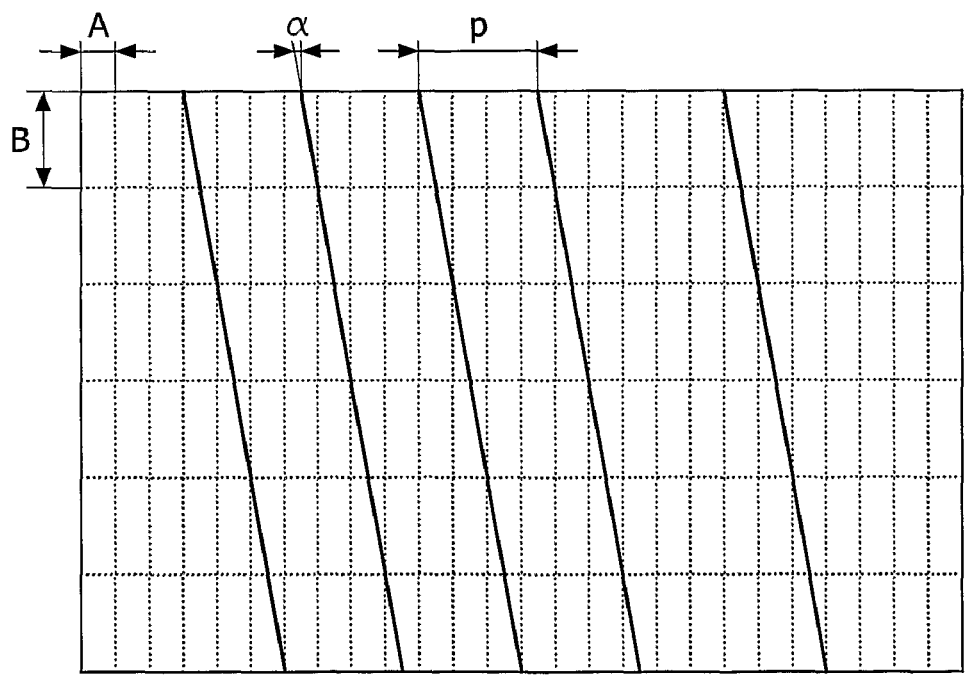
Figure 3:
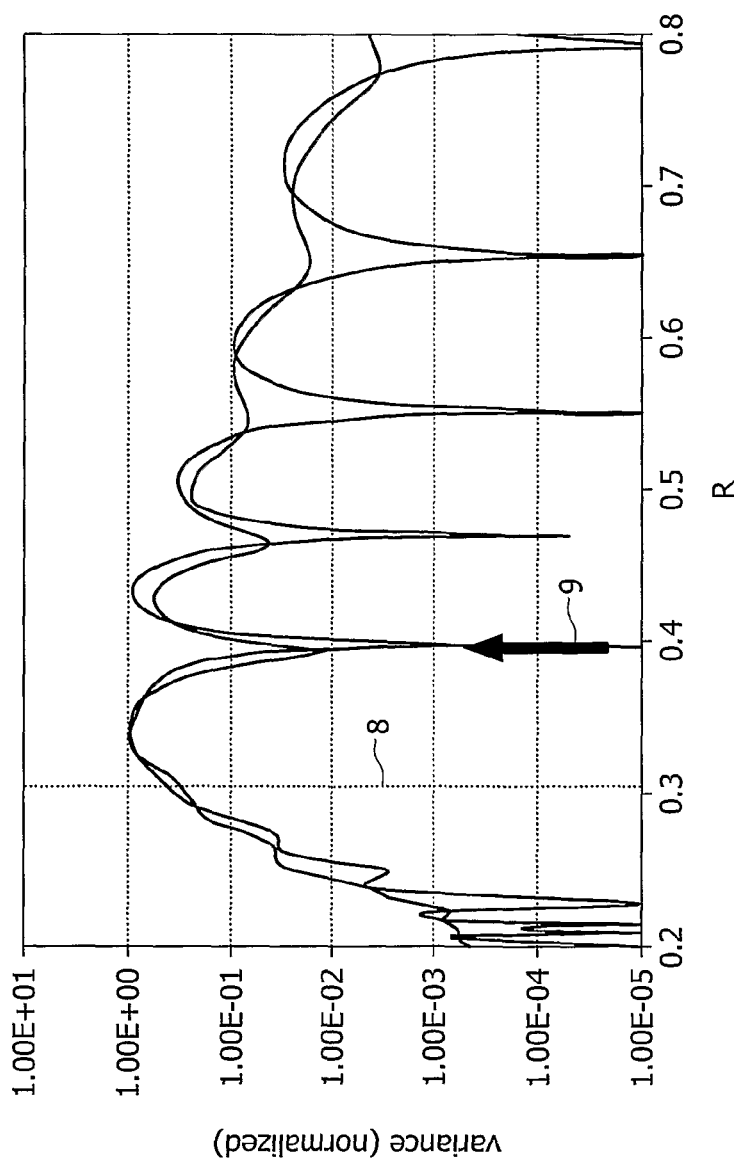
FIG. 3 shows the (relative) modulation depth of the band structure as a function of lens radius for a device according to the invention and FIG. 4 shows a measure for cross talk between the views in such a device.
Figure 4:
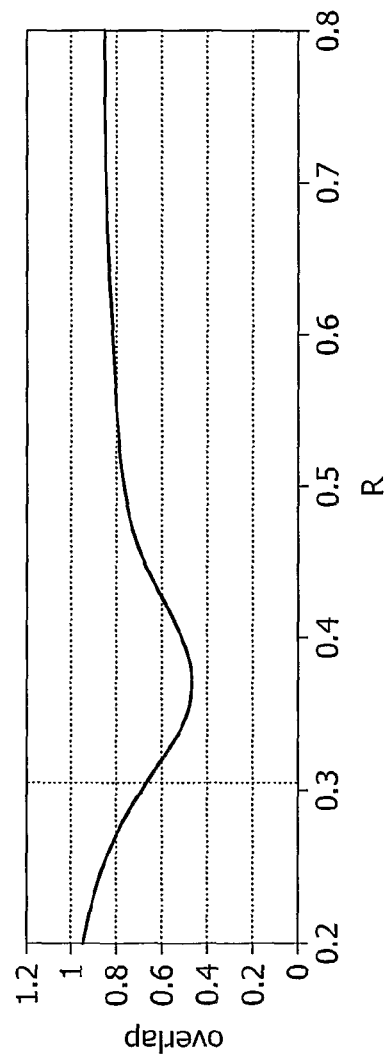

FIGS. 3 and 4 show a typical result for a device having the geometry and structure of FIGS. 1,2. FIG. 3 shows the (relative) modulation depth of the band structure as a function of lens radius. FIG. 4 shows the "overlap", a measure for cross talk between the views (a small overlap is preferred). The lens radius R for the case that the focal plane coincides with the LCD cell is indicated by the dashed line 8 (in this example R=303.3 μm). This radius gives a relatively high modulation depth. At a radius of 388.5 μm (indicated by arrow 9) the modulation depth is two orders of magnitude lower and the value of the "overlap" is also more favorable. At higher radii more minima in the variance are observed but they are relatively less favorable with respect to both variance and overlap. In the case of r=388.5 μm the focal plane of the lenses is located about 257 μm below the LCD cells.

The optimum radius depends on the configuration and on the specific dimensions of the system. With the configuration of FIG. 2 (lenses on a separate plate facing the display, nine views, slant ⅙), the most important parameters are:

1) the (glass) thickness d of the front panel (between the (LCD) cell) picture elements 2 and the lenses 4
2) the size p of the (LCD cell) picture elements 2, characterized by p=3*A, assuming A:B=1:3).

It can be deduced that for dimensions close to the dimensions shown in FIGS. 1,2 the optimum radius $R_{opt}$ depends on the thickness d and on the picture element pitch p as:

$$R_{opt}=0.3665*d+0.2403*p-0.0063. \text{ (R, d and p in mm)}$$

For comparison, it should be noticed that in the case of an ideal lens with the focal plane coinciding with the LC cell the dependence of R on d and p is R=0.3333*d.

In a similar way it is deduced for an eight views display with α=atan(⅓) the optimum radius depends on the thickness d and on the picture element pitch p as:

$$R_{opt}=0.3934*d+0.3805*p-0.0156. \text{ (R, d and p in mm)}$$

Here the pitch of the lenses is such that distance between the lenses measured in the horizontal direction equals eight times the sub-picture element pitch, i.e. pitch=8*A/cos(α). This results in an eight views display. (The lens pitch may be slightly adapted to provide a viewing-point correction.)

Figure 5:
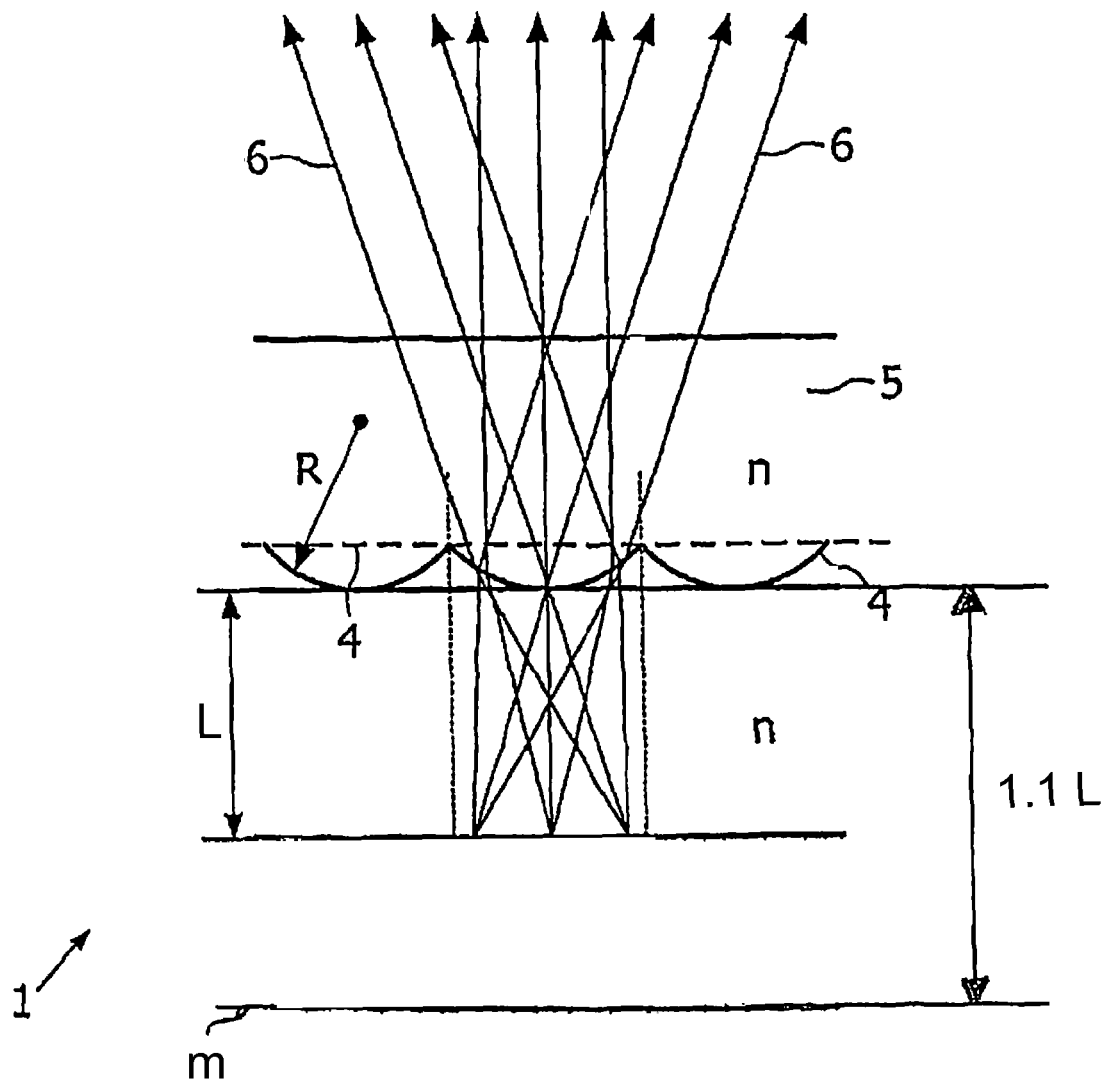
FIG. 5 shows the distance between the main focus plane and a central surface Of the optical directory elements.

It should be noted that the values as mentioned here in practice may vary, due to both design and manufacturing, resulting in a variation of R between $0.8*R_{opt}$ and $1.25*R_{opt}$ FIG. 5 shows the distance between the main focus plane m and a central surface of the optical directory elements, L being the focus distance of a central surface of the optical directory elements. The relative distances are not to scale. The distance between the main focus plane m and a central surface of the optical directory elements may be less than L (not shown).

Although in the examples a liquid crystal display is shown, invention can also be used in other kinds of displays such as foil-displays LED-displays etcetera.

The invention resides in each and every novel characteristic feature and each and every combination of features. Reference numerals in the claims do not limit the protective scope of these claims. The use of the verb "to comprise" and its conjugations does not exclude the presence of elements other than those stated in the claims. The use of the article "a" or "an" preceding an element does not exclude the presence of a plurality of such elements.

The invention claimed is:

1. A stereoscopic display apparatus comprising:
a means for producing a display having picture elements that are laterally separated in a first plane, neighboring picture elements being separated by a non-emitting area, and the neighboring picture elements in combination with the non-emitting area forming a band structure, and
an optical directory means comprising a group of optical directory elements each of which is associated with a group of picture elements, the optical directory means further comprising an array of lenticular elements overlying the picture elements in the first plane for directing the outputs of the picture elements in mutually different angular directions, wherein a radius of curvature of the lenticular elements is determined based on a local minimum of a variance of intensity of the band structure as a function of the radius of curvature.

2. A stereoscopic display apparatus according to claim 1, the distance between a main focus plane and a central surface of optical directory elements being at most 0.9 L, L being focus distance of a central surface of the optical directory elements.

3. A stereoscopic display apparatus according to claim 1, the distance between a main focus plane and a central surface of optical directory elements being at least 1.1 L, L being focus distance of a central surface of the optical directory elements.

4. A stereoscopic display apparatus according to claim 1, the laterally separated picture elements being arranged in rows and columns.

5. A stereoscopic display apparatus according to claim 4 the optical directory elements having lenticular elements extending parallel to each other and being slanted at an angle to one of the rows and columns of picture elements so as to create repeating groups of picture elements each of which groups is constituted by adjacent picture elements in at least two of said rows and columns.

6. A stereoscopic display apparatus according to claim 5 the lenticular elements extending at a slant to one of the display element rows and columns, the tangent of the slant angle having a value between 0.3 and 0.6.

7. A stereoscopic display apparatus according to claim 6 the lenticular elements creating eight repeating groups of picture elements, the slant angle having a value α of substantially arc tangent ⅓.

8. A stereoscopic display apparatus according to claim 7 the radius of curvature R of a central surface of the lenticular elements having a value of $0.80*\rho<R<1.25*\rho$, in which $\rho=0.3934*d+0.3805*p-0.0156$, d being the distance between the first and the central surface lenticular array elements in mm, p being the picture element pitch in mm.

9. A stereoscopic display apparatus according to claim 5 the lenticular elements creating nine repeating groups of display elements, the slant angle having a value α of substantially arc tangent ⅙.

10. A stereoscopic display apparatus according to claim 9 the radius of curvature R of a central surface of the lenticular elements having a value of $0.80*\rho<R<1.25*\rho$ in which $\rho=0.3665*d+0.2403*p-0.0063$, d being the distance between the first plane and the central surface lenticular array elements in mm, p being the picture element pitch in mm.

11. The stereoscopic display apparatus according to claim 1, wherein the radius of curvature of the lenticular elements is further based on minimum cross talk overlap between the outputs of the picture elements.

12. A stereoscopic display comprising:
a display having picture elements that are laterally separated in a first plane, where neighboring picture elements are separated by a non-emitting area, and the neighboring picture elements in combination with the non-emitting area forming a band structure; and
a group of optical directory elements each of which is associated with a group of picture elements, the group of optical directory elements further comprising an array of lenticular elements overlying the picture elements in the first plane for directing the outputs of the picture elements in mutually different angular directions, wherein a radius of curvature of the lenticular elements is determined based on a local minimum of a variance of intensity of the band structure as a function of the radius of curvature.

* * * * *